United States Patent [19]
Johnson

[11] Patent Number: 5,303,262
[45] Date of Patent: Apr. 12, 1994

[54] METHOD AND APPARATUS FOR TRIGGERING MEASUREMENTS FROM A TDMA SIGNAL

[75] Inventor: Matthew Johnson, Liberty Lake, Wash.

[73] Assignee: Hewlett-Packard Company, Palo Alto, Calif.

[21] Appl. No.: 839,827

[22] Filed: Feb. 21, 1992

[51] Int. Cl.$^5$ .............................................. H04B 3/46
[52] U.S. Cl. ........................................ 375/10; 375/94
[58] Field of Search ................. 375/10, 94, 95, 96, 375/106; 329/304, 311; 342/386

[56] References Cited

U.S. PATENT DOCUMENTS

| | | | |
|---|---|---|---|
| 3,921,076 | 11/1975 | Currie | 375/95 |
| 4,805,189 | 2/1989 | Mahony | 375/10 |
| 5,001,724 | 3/1991 | Birgenheier et al. | 375/10 |
| 5,097,486 | 3/1992 | Newby et al. | 375/94 |
| 5,121,413 | 6/1992 | Voegtly et al. | 375/95 |
| 5,187,719 | 2/1993 | Birgenheier et al. | 375/94 |

OTHER PUBLICATIONS

Birgenheier, "Technique for Measuring Phase Accuracy and Amplitude Profile of Continuous-Phase-Modulated Signals", Heweltt-Packard, Apr. 1989, pp. 1-21.

Birgenheier et al., "Method and Apparatus for Measuring Modulation Accuracy", U.S. patent application Ser. No. 07/559,313, Filed Jul. 30, 1990, 40 pages.

Primary Examiner—Stephen Chin

[57] ABSTRACT

A measurement apparatus and method for triggering and making analog measurements of radio frequency (RF) bursts in a time domain multiple access communications system. An RF level detector or edge detector triggers an analog sampler which acquires measurement data from a spectrum analyzer or an RF peak detector. A digital signal processor processes the RF burst to detect a known bit sequence and calculates a timing relationship between the triggering of measurement samples and transmitted data bits in the RF burst. A host processor uses the calculated timing relationship to identify and analyze the measurement data pertaining to desired measurements of the RF burst.

9 Claims, 3 Drawing Sheets

METHOD AND APPARATUS FOR TRIGGERING MEASUREMENTS FROM A TDMA SIGNAL

FIELD OF THE INVENTION

The present invention relates generally to digital radio equipment and, more specifically relates to triggering of analog measurements of radio frequency bursts in a time domain multiple access (TDMA) communications system.

BACKGROUND AND SUMMARY OF THE INVENTION

TDMA communications systems typically comprise a large number of individual radio transceiver units, often originating with different manufacturers. In order to function properly, it is necessary that all units operating within the system function according to the same specifications. An example of this is the proposed Group Speciale Mobile (GSM) pan-European digital cellular system. This system would require that all components, such as transmitters and receivers, be manufactured to standard specifications measured by a common method.

In a TDMA system, digital information intended for a single receiver out of many is modulated onto a single frequency signal transmitted to all receivers. Multiple users of a single frequency signal are accommodated by allowing access to the signal by each individual user at different time intervals. In the GSM system, the timed access is divided into groups of eight time frames. Each time frame is an allotted time interval for one radio frequency (RF) burst containing digital information meant for an individual receiver. Obviously, in such a time dependent system, the timing of an analog measurement to determine conformance with a specification must be coordinated with the digital information in a RF burst in order to obtain meaningful measurement results. However, in a RF communications system, it is not always possible to have a trigger signal available to trigger the measurements. In these circumstances, it is necessary to trigger the measurement from the RF signal itself.

Existing measurement devices do not have the capacity of generating a trigger signal and determining its timing relationship to digital information in an RF burst from the RF burst itself. Instead, these prior devices require a direct, hard-wired connection to the TDMA system's frame clock to provide a trigger signal. Additionally, in order to coordinate the frame clock trigger signal with analog measurements of the RF burst, the user must provide the measurement device with a known timing relationship between the trigger signal and the RF burst on the TDMA system's signal. Thus, the user must know the location, in time, of the trigger signal relative to the RF burst to be measured. Some examples of these prior devices are the Hewlett-Packard (HP) 71125C, HP 71250C and HP 8591A with HP 85715A personality.

The present invention makes possible the triggering of analog measurements such as peak power of the RF signal, pulse on/off ratio of the RF burst or adjacent channel interference, from the RF burst itself. When triggered, these analog measurements are stored as a trace sample. The invention triggers the measurements by generating a trigger pulse when a rising RF level is detected in the TDMA signal. Although the illustrated embodiment of this invention uses RF level detection for triggering, edge detection of the rising edge of the RF burst can alternatively be implemented. Through digital signal processing (DSP) of the TDMA signal, the digital data transmitted by the radio under test is demodulated. The digital signal processor then searches for a predetermined midamble in the data from the RF burst that is used to synchronize to the data. Once synchronized, the DSP analyzer can determine the location of the trigger relative to the beginning of the data in the RF burst, to generate a timing reference. With the trigger pulse signal and the timing reference information, the invention is able to correctly identify which elements in the trace sample are to be used for analog measurements of the TDMA signal.

Additional features and advantages of the invention will be made apparent from the following description of the preferred embodiment, which proceeds with reference to the accompanying drawings.

DETAILED DESCRIPTION OF THE PREFERRED EMBODIMENT

Figure 1:
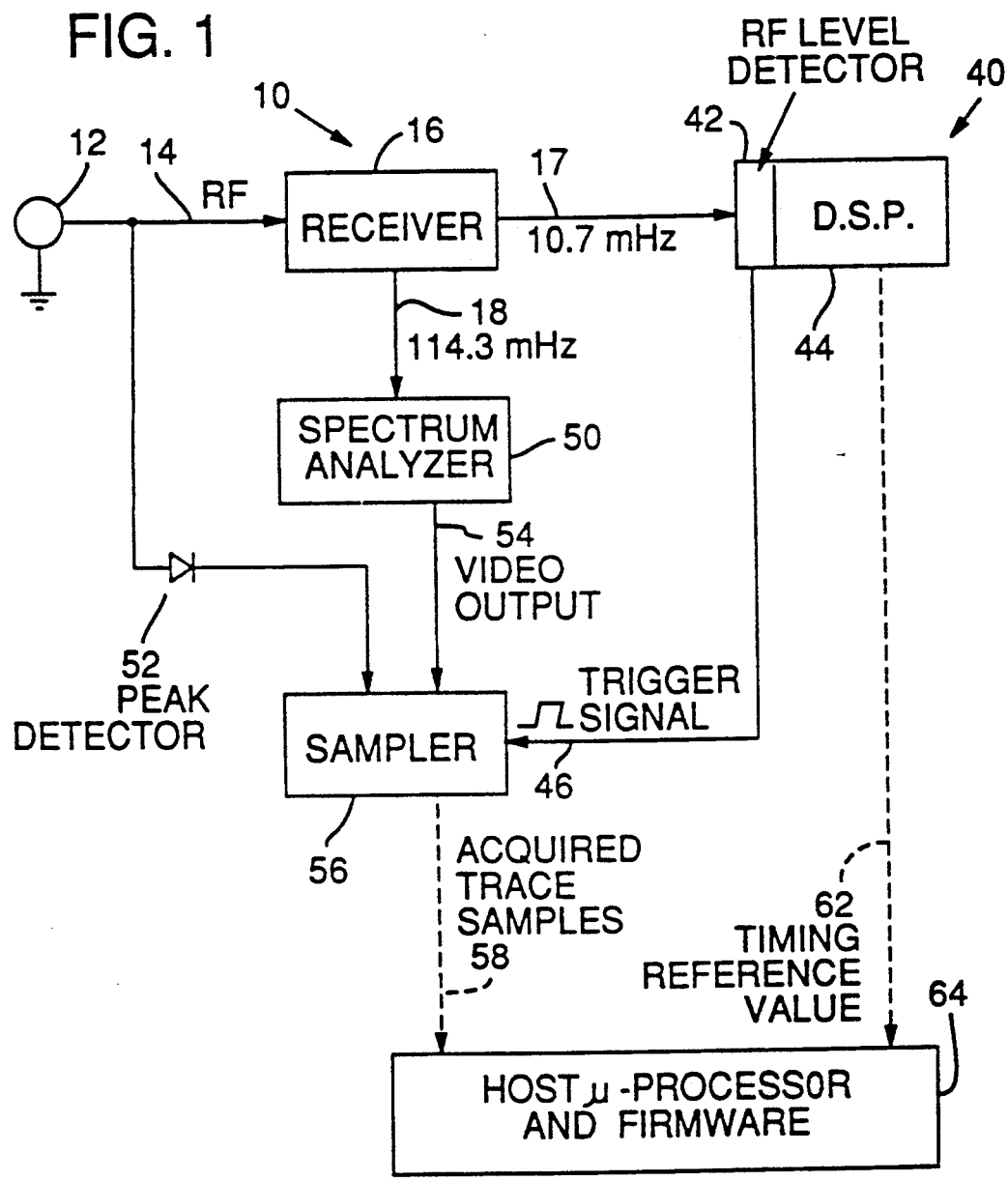
FIG. 1 is a block diagram of an apparatus for making triggered, analog measurements of RF bursts in a TDMA communications system in accordance with this invention.

The preferred embodiment of the invention is the measurement apparatus 10 illustrated by the block diagram in FIG. 1. In the measurement apparatus 10, a RF signal 14 [hereinafter TDMA signal 14] from the TDMA communications system (not shown) is received through an antenna 12 by a receiver 16. The receiver 16 downconverts the TDMA signal 14 into an intermediate frequency (IF) signal 17 which, in the preferred embodiment, has a frequency of 10.7 MHz. The TDMA signal 14 is also downconverted to a second IF signal 18 at 114.3 MHz.

Figure 2:
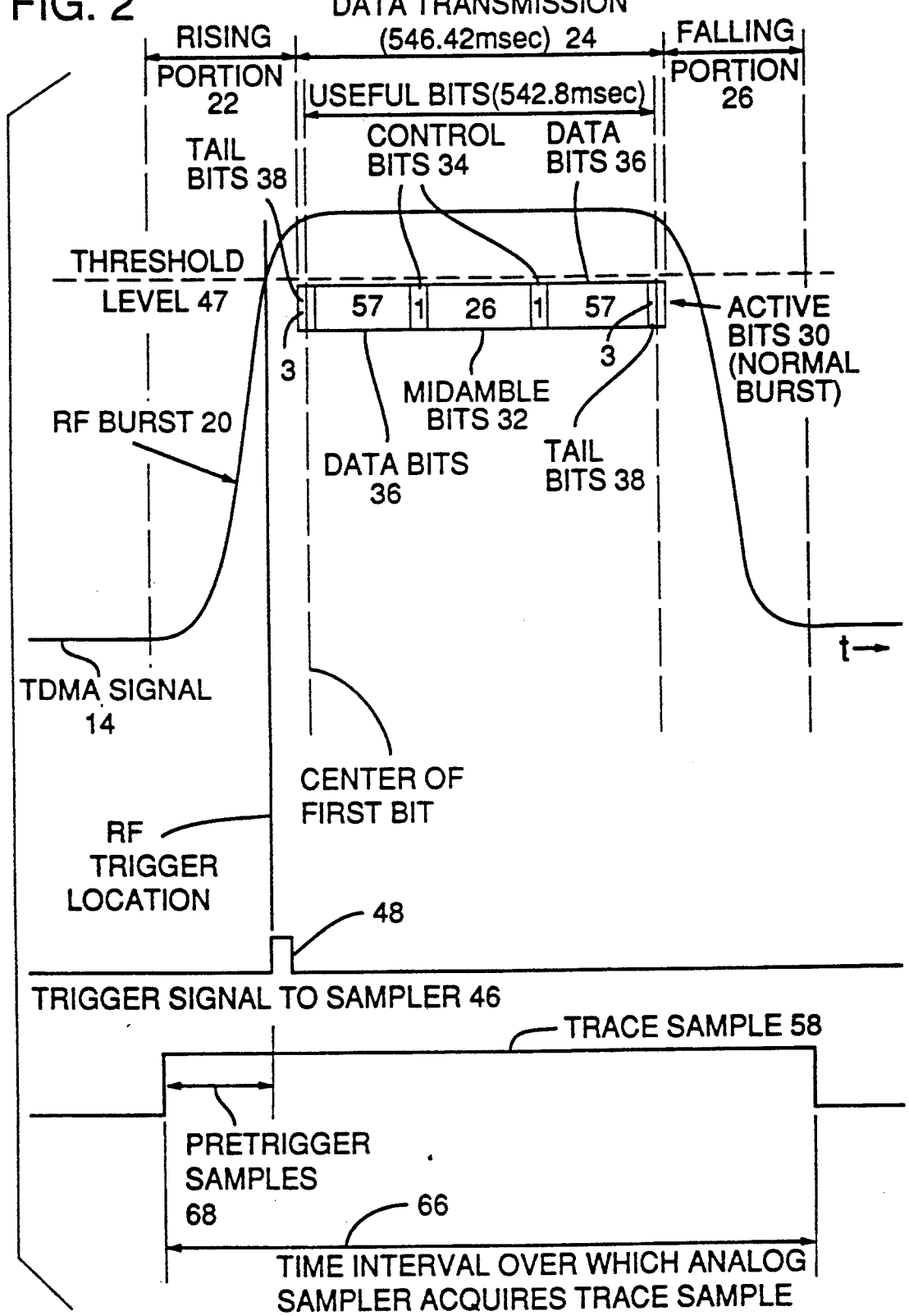
FIG. 2 is a waveform diagram showing the timing relationship of signals generated by the apparatus of FIG. 1 to a RF burst received by the apparatus from a transmitter conforming to GSM standards.

The TDMA signal 14 is illustrated in FIG. 2. The illustrated TDMA signal conforms to the GSM specification. While the preferred embodiment of the invention is adapted to measure TDMA signals of this type, it is to be understood that the present invention is not limited to use with GSM standard TDMA systems.

The TDMA signal 14 contains a RF burst 20 transmitted by one of the transmitters in the TDMA system during a time frame allotted for the particular transmitter's use. In a TDMA system conforming to the GSM standard, the duration of a time frame is 577 microseconds. Within this time frame, the transmitter must turn on, transmit information, and turn off again. Because of this need, the GSM standard specifies an amplitude envelope for the transmitted RF bursts. The amplitude of RF bursts must fall within the specified envelope.

The RF burst 20 is characterized by a rising RF level portion 22, a data transmission portion 24, and a falling RF level portion 26. During the rising RF level portion 22, the amplitude of the transmitted TDMA signal is allowed to increase from less than −70 db to 0 db. During the data transmission portion 24, the amplitude of the TDMA signal must remain constant, within a range of ±0.5 db. The amplitude of the TDMA signal must again fall below −70 db during the falling RF level portion 26.

Information is modulated onto the TDMA signal during the data transmission portion 24 of the RF burst 20. In the GSM system, RF bursts can be one of two different lengths. In the longer, normal burst 20 shown in FIG. 2, this data transmission portion is 546.42 microseconds in duration and may contain 148 active bits 30 of information. Of the 148 active bits, there are 147 "useful" bits. The shorter, access burst (not shown) contains 87 useful bits. The useful bits are measured from the middle of the first active bit to the middle of the last active bit. The difference between the active bits and the useful bits is that, with the useful bits, one half of a bit is lost off each end of the active bits. The active bits 30 of the normal burst consist of a mid-amble 32, control bits 34, data bits 36, and tail bits 38. The mid-amble 32 is a group of 26 bits having a known, predetermined bit sequence.

Referring again to FIG. 1, a digital signal processor (DSP) board 40 is connected to receiver 16 to receive the IF signal 17. The DSP board 40 comprises an RF level detector 42 and a DSP circuit 44. The RF level detector 42 produces a trigger signal 46. The trigger signal 46 is shown in FIG. 2. When the RF level of the TDMA signal 14 rises above a threshold level 47 during the rising portion 22 of the RF burst 20, the RF level detector 42 generates a trigger pulse 48 on the trigger signal 46. In an alternate embodiment of the invention, the trigger signal 46 may instead be generated by an edge detector on the rising edge of the RF burst.

Referring to FIG. 1, two separate circuits, a spectrum analyzer 50 and a RF peak detector 52, continuously measure the TDMA signal 14. Once coordinated with the trigger pulse, the RF peak detector's measurements are useful in determining the RF power of the RF burst 20 in the TDMA signal 14. The spectrum analyzer's measurements are useful in measuring characteristics of the TDMA signal 14 such as pulse on/off ratio and the output RF spectrum in adjacent channels caused by the RF burst 20. The RF peak detector 52 directly measures TDMA signal 14, while the spectrum analyzer 50 measures the downconverted IF signal 18. The video output 54 of spectrum analyzer 50 and the output of peak detector 52 are both multiplexed in an analog sampler 56.

The trigger signal 46 controls the sampler 56. The sampler 56 continuously receives analog measurement data from the spectrum analyzer 50 and the peak detector 52 and stores measurement data from a selected one of these sources in a trace sample 58. Upon receiving the trigger pulse 48, the sampler 56 completes the trace sample 58. FIG. 2 shows the interval 66 during which measurement data stored in the trace sample was acquired. Some of the measurement data acquired prior to the trigger pulse 48 (pretrigger samples 68) are retained in the trace sample 58.

The DSP circuit 44 on the DSP board 40 processes the IF signal 14 to calculate a timing reference value 62 relating the trigger pulse 48 to the first useful bit in the RF burst 20. The timing reference value 62 is used by the host microprocessor 64, as described below, to identify the correct analog measurements in the trace sample 58 that are relevant to the RF burst.

Figure 3:
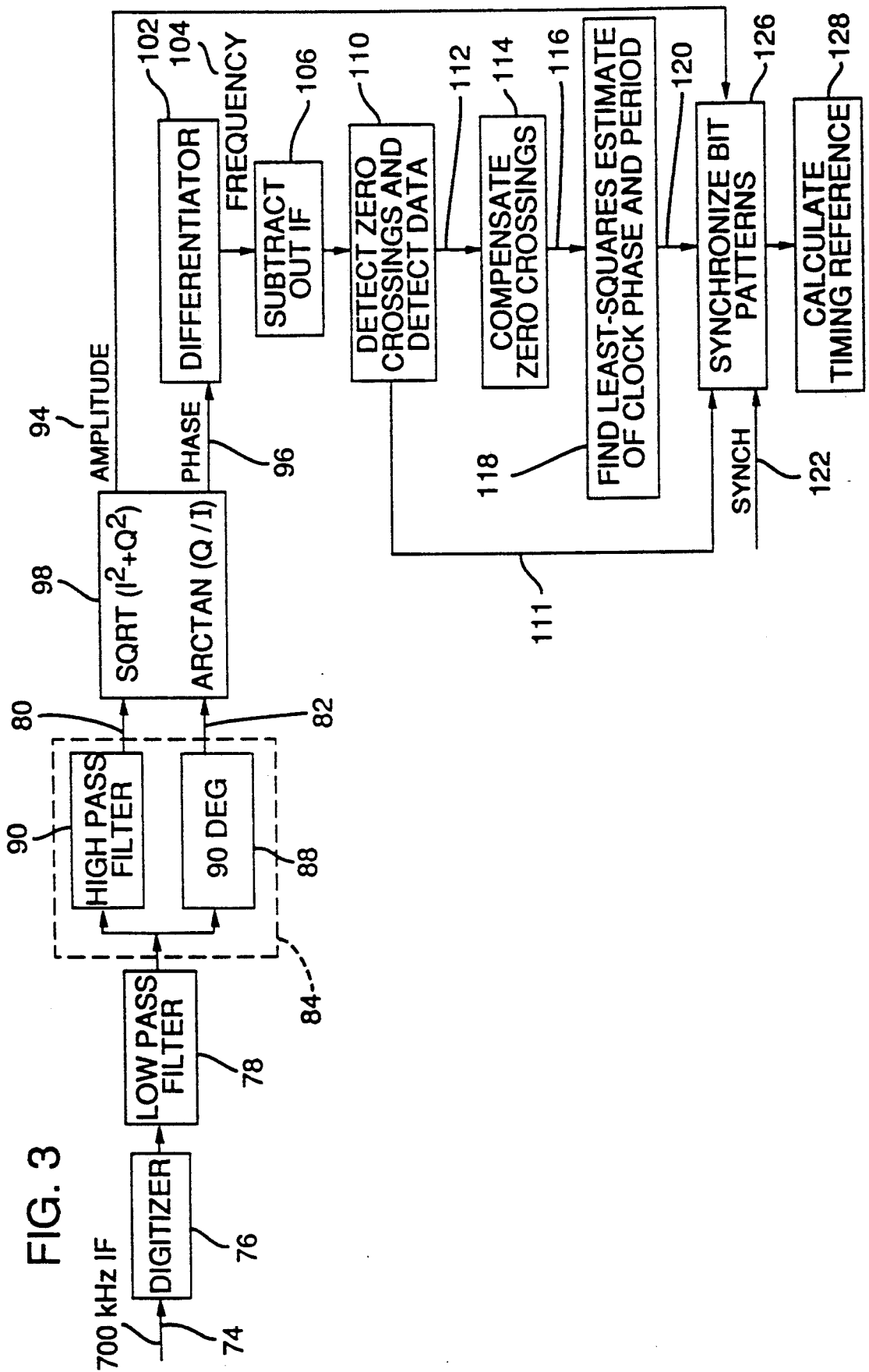
FIG. 3 is a signal flow diagram illustrating the operation of a digital signal processor used in the apparatus of FIG. 1.

FIG. 3 diagrams the calculation of the timing reference value 62 by the DSP circuit 44. In the DSP circuit 44, the first IF signal (10.7) MHz is downconverted to a 700 kHz IF signal 74. The IF signal 74 is converted to a digital form by an analog to digital converter 76. This digitized signal is then filtered 78 by a low-pass filter to eliminate harmonics of the IF signal 74. The low-pass filter is preferably implemented as a finite impulse response (FIR) filter having a linear phase response to avoid distortion of the phase modulation of the IF signal.

After filtering 78, the IF signal 74 is transformed 84 into its component in-phase and quadrature-phase signals 80 and 82. The transformation 88 to the quadrature-phase signal 80 is preferably performed by a Hilbert transformer comprising a filter with a constant magnitude response and a phase response of −90° for positive frequencies and +90° for negative frequencies. The Hilbert transformer may be realized with an anti-symmetric FIR filter that has an ideal phase response and an amplitude response that is nearly ideal over the range of frequencies of the IF signal 74. The in-phase component signal transformation 90 is preferably performed by a high-pass filter connected in parallel with the Hilbert transformer.

Next, the TDMA signal's amplitude and phase functions 94 and 96 are calculated 98 from the component signals 80 and 82. The amplitude function 94, A[k], and the phase function 96, θ[k], are calculated from the following equations, where I[k] is the in-phase signal 80; Q[k] is the quadrature signal 82; k is the index of a sample in the digitized signal; and K +1 is the number of samples in a burst:

$$A[k] = (I^2[k] + Q^2[k])^{\frac{1}{2}}; k = 0,1,2,3,\ldots, K \qquad (1)$$

$$\theta[k] = Arctan(Q[k]/I[k]); k = 0,1,2,3,\ldots, K \qquad (2)$$

The phase function 96 is then differentiated 102 by a differentiator to produce samples of a frequency versus time function 104. The differentiator is preferably implemented as an anti-symmetric FIR digital filter having a linear magnitude response and a 90° phase shift over the range of frequencies of the IF signal 74. Such a digital differentiator is well-known and may be easily and accurately implemented in digital hardware.

After differentiating 102, the IF carrier frequency is subtracted 106 from the frequency function 104 to produce a frequency deviation function. The frequency deviation of the IF signal 74 from its carrier frequency is related to the sequence of the active bits 30 in the RF burst 20. Specifically, a positive value of frequency deviation over a bit interval represents one binary state, while a negative value of frequency deviation represents the other binary state. The frequency deviation function so produced is not a continuous time function, but rather comprises discrete time samples of the frequency deviation function.

The next step 110 is to detect the bit sequence 111 of the active bits 30 from the frequency deviation function by determining the zero crossings 112 of the function. The zero crossings are found through the use of an interpolation algorithm. The zero crossings 112 will occur at intervals of approximately the interval between bits in the RF burst 20. However, the timing of the zero crossings 112 deviates from a constant bit rate in accordance with the sequence of the active bits 30. For example, in a GSM standard system, if a binary bit pair "10" is followed by a bit pair "11", the zero crossing will deviate −0.0142 of a bit interval from the crossing that would occur if bit pair "00" were followed by bit pair "11". The bit sequence 111 of the active bits 30 is, therefore, detectable from the timing of the zero crossings 112. The bit sequence 111 data is detected with a maximum likelihood sequence estimator utilizing the Viterbi algorithm.

Next, the zero crossings 112 are compensated 114 to correct for their deviance from a constant bit rate. These compensated zero-crossings 116 provide data needed to perform a least-squares estimate 118 of the transmitter's data clock 120 (the original timing at which the active bits were transmitted).

A sequence of data bits (synch signal 122), known to occur in the midamble 32 of the active bits 30, is then synchronized 126 with the bit sequence 111 using the estimated transmitter data clock 120. A discrete-time cross-correlation of the bit sequence 111 to the synch signal 122 identifies the midamble bits of the bit sequence 111. Also, the amplitude function 94 is used to identify the leading and trailing edges of the data transmission portion 24. This establishes the duration of the data transmission portion 24.

Finally, the timing reference value 62 is calculated 128. The midamble bits 32 were identified in synchronization step 126. Counting back 61 bit periods (1 control bit 34, 57 data bits 36, and 3 tail bits 38) from the occurrence of the midamble bits 32 in the RF burst 20 gives the timing of the first of the active bits. The first useful bit occurs one half of a bit period after the first active bit. The difference in time from the trigger pulse 48 to the first useful bit is the timing reference value 62.

Referring again to FIG. 1, the host microprocessor 64 gathers information from several sources in the measurement apparatus 10 When a trace sample 58 is completed, the host micro-processor 64 loads the trace sample data into its random access memory (RAM). The host microprocessor 64 also gathers state and calibration information that is used to convert the trace sample magnitude values to calibrated power levels. The microprocessor queries the DSP board 40 and receives the timing reference value 62 to identify the correct subset of samples used in making and calculating the analog measurement of the RF burst. Since, in the GSM system, RF bursts can be one of two different lengths, the microprocessor 64 further queries the length of the burst measured from the DSP board.

To determine which subset of the trace sample 58 to use for a measurement, the micro-processor 64 starts with a default, nominal element in the trace sample where the center of the first bit would be if the trigger signal were perfectly aligned with the center of bit zero. This location is shifted by the timing reference value 62. The location is further modified to correct for differences in delays through the different signal paths in the invention. The micro-processor then uses the length of the burst measured to determine the location in the trace sample of the center of the last bit. With these two points located in the trace sample, the trace elements that pertain to the desired measurement are analyzed to calculate the measurement result. The micro-processor 64 holds appropriate software for completing each of its tasks in its Read Only Memory (ROM).

Additional information on the measurement of TDMA signals can be found in U.S. Pat. No. 5,001,724, the disclosure of which is incorporated herein by reference.

Having described and illustrated the principles of my invention with reference to an illustrative embodiment, it will be recognized that the invention can be modified in arrangement and detail without departing from such principles. Accordingly, I claim as my invention all such embodiments as may come within the scope and spirit of the following claims and equivalents thereto.

I claim:

1. A radio frequency ("RF") measurement apparatus for making triggered, analog measurements of an RF signal in a time domain multiple access ("TMDA") communications system, the RF signal comprising digital information modulated in bursts on an RF carrier, the RF
   a receiver having an output;
   a level detector connected to the receiver output for detecting a level of the RF signal and for generating a trigger signal when the level of the RF signal exceeds a predetermined threshold level;
   analog measurement means connected to the receiver means for measuring and sampling the RF signal to generate a trace sample; and
   processing means for determining a timing relationship between the trigger signal and the digital information and for identifying from the timing relationship a subset of samples of the trace sample to be used in an RF burst measurement.

2. The RF measurement apparatus of claim 1 wherein the analog measurement means comprises:
   a spectrum analyzer connected to the receiver output for measuring analog characteristics of the RF signal and for generating a video output signal;
   a radio frequency peak detector for measuring the RF signal and for generating a peak detector output signal;
   a sampler means for sampling at least one of the video output signal and the peak detector output signal and for generating, in response to the trigger signal, the trace sample from samples of said at least one of the video output signal and the peak detector output signal.

3. The RF measurement apparatus of claim 1 wherein the processing means comprises:
   a digital signal processor connected to the receiver output for analyzing data modulated on the RF signal to determine a timing relationship between the trigger signal and the data modulated on the RF signal, and for generating a timing reference value based on the timing relationship; and
   a host processor connected to the analog measurement means and the digital signal processor for identifying with the timing reference value a subset of samples from the trace sample to be used in an RF burst measurement.

4. A radio frequency measurement apparatus for making triggered, analog measurements of a radio frequency signal in a time domain multiple access ("TDMA") communications system, the radio frequency signal comprising digital information modulated in bursts on a radio frequency carrier, the radio frequency measurement apparatus comprising:
   a receiver for receiving the radio frequency signal and downconverting the radio frequency signal to a first intermediate frequency signal and a second intermediate frequency signal, the first intermediate frequency signal and the second intermediate frequency signal not necessarily having different frequencies, the receiver having an output;
   a detector connected to the receiver output for detecting a predetermined signal characteristic in the first intermediate frequency signal and for generating a trigger signal in response thereto;

a spectrum analyzer connected to the receiver output for measuring analog characteristics of the second intermediate frequency signal and for generating a video output signal;

a radio frequency peak detector for receiving the radio frequency signal and for generating an output signal in response to the radio frequency signal;

a sampler for sampling a selected one of the video output signal generated by the spectrum analyzer or the output signal generated by the radio frequency peak detector and for generating a trace sample responsive to the trigger signal;

a digital signal processor for analyzing data on the first intermediate frequency signal to determine a timing relationship between the trigger signal and the digital information on the radio frequency signal and for generating a timing reference value based on the timing relationship; and a host processor connected to the sampler and the digital signal processor for identifying with the timing reference value a correct subset of samples from the trace sample and for making the analog measurements from the subset of samples.

5. A method of triggering analog measurements of radio frequency bursts in a time domain multiple access ("TDMA") communications system, the radio frequency bursts having modulated therein transmitted data bits including a predetermined bit sequence, the method comprising the steps:

determining an amplitude of a radio frequency burst signal;

generating a trigger signal when the amplitude exceeds a predetermined threshold;

collecting, in response to the trigger signal, a set of samples of measured analog characteristics of the radio frequency burst;

determining a timing relationship between the trigger signal and the predetermined bit sequence modulated in the radio frequency burst; and identifying, with the timing relationship, a subset of measurement samples related to the radio frequency bursts within the sets of samples.

6. The method of claim 5 wherein the steps of determining an amplitude and generating a trigger signal comprise the steps:

edge detecting a rising edge of a radio frequency burst; and generating the trigger signal in response to a detected rising edge.

7. The method of claim 5 wherein the steps of determining an amplitude and generating a trigger signal comprise the steps:

detecting an RF level of a radio frequency burst; and generating the trigger signal when the RF level rises above a predetermined level.

8. The method of claim 5 wherein the step of collecting comprises sampling measurement data obtained by a spectrum analyzer and a radio frequency peak detector.

9. The method of claim 5 wherein the step of determining a timing relationship comprises:

transforming a radio frequency signal containing the radio frequency burst into an in-phase component signal and a quadrature-phase component signal;

calculating an amplitude function and a phase function for the radio frequency signal from the in-phase and quadrature-phase component signals;

differentiating the phase function to produce a frequency function for the radio frequency signal;

subtracting from the frequency function, the carrier frequency of the radio frequency signal, to produce a frequency deviation function;

detecting the transmitted data bits in the radio frequency burst from the frequency deviation function;

synchronizing a synch signal corresponding to the predetermined bit sequence with the detected transmitted data bits; and calculating a timing relationship between the predetermined bit sequence and the trigger signal.

* * * * *